US006547089B2

(12) United States Patent
Pozgainer et al.

(10) Patent No.: US 6,547,089 B2
(45) Date of Patent: Apr. 15, 2003

(54) TANK CAP

(75) Inventors: Gunther Pozgainer, Graz (AT); Wolfgang Suppan, Studenzen (AT); Gerald Lackner, Graz (AT); Conrad Scharrer, Hilden (DE)

(73) Assignee: Tesma Motoren und Getriebetechnik Ges. m.b.H., Preding (AT)

( * ) Notice: Subject to any disclaimer, the term of this patent is extended or adjusted under 35 U.S.C. 154(b) by 0 days.

(21) Appl. No.: 09/863,724

(22) Filed: May 23, 2001

(65) Prior Publication Data
US 2001/0047995 A1 Dec. 6, 2001

(51) Int. Cl.[7] ............................................. B65D 53/00
(52) U.S. Cl. ................. 220/304; 220/581; 220/DIG. 33
(58) Field of Search .......................... 220/304, 581, 220/582, DIG. 33, DIG. 32, 86.2

(56) References Cited

U.S. PATENT DOCUMENTS

| 4,685,584 | A | * | 8/1987 | Harris | 137/202 |
|---|---|---|---|---|---|
| 5,385,256 | A | * | 1/1995 | Brown | 220/315 |
| 5,480,055 | A | * | 1/1996 | Harris et al. | 220/203.26 |
| 5,885,662 | A | | 3/1999 | Gardner, Jr. | 427/426 |
| 6,003,709 | A | * | 12/1999 | Hagano et al. | 220/203.24 |
| RE36,927 | E | * | 10/2000 | Griffin et al. | 220/326 |
| 6,336,482 | B1 | * | 1/2002 | Cunkle et al. | 141/301 |

FOREIGN PATENT DOCUMENTS

| EP | 0 621 154 A1 | 12/1994 |
|---|---|---|
| JP | 4086312 | 3/1992 |

* cited by examiner

Primary Examiner—Stephen K. Cronin
Assistant Examiner—Lien Ngo
(74) Attorney, Agent, or Firm—Clark Hill PLC

(57) ABSTRACT

A tank cap has a cap part, a filler neck for receiving a refueling nozzle wherein the neck can be closed by the cap part via a rotary closure having at least two seals arranged on the cap part and active between the cap part and the neck. The sealing surfaces on the neck are provided behind a raised region of a protuberance and below at least one projection.

10 Claims, 1 Drawing Sheet

TANK CAP

BACKGROUND OF THE INVENTION

1) Field of the Invention

The invention relates to a tank cap with a cap part and with a filler neck for a refueling nozzle, wherein the filler neck can be closed by the cap part via a rotary closure, and with at least two seals arranged on the cap part and active between the cap part and the filler neck.

2) Description of the Related Art

In order to make tank caps for fuel tanks of motor vehicles liquidtight, it is common to arrange seals of various shapes and cross sections between the filler neck and the removable cap part. These seals are usually compressed by bayonet or thread means on rotation of the cap part and consequently bring about a type of seal to prevent liquid fuel from coming out. It is now known that, even if the seal makes good contact, fuel vapors can still escape to the outside as they diffuse through the seal. Recently, the level of fuel emissions caused in this way has to an increasing extent been drastically limited by statutory regulations. For fuel caps, the permitted permeation quantity is to be restricted to 3 milligrams of hydrocarbons per day (24 hours). Even with the most carefully designed seal, this cannot be achieved.

A tank cap which is designed in such a manner that this limit value can be observed is described in applicant's Austrian Utility Model Application GM 610/99. In this case, a system comprising two seals is proposed for sealing the cap part in relation to the filler neck, one of which lies further in and the other further out relative to the filler neck. The seal lying further out includes an elastomer with high permeation resistance and is arranged in such a manner in relation to the seal lying further in that only a narrow gap remains between the two seals. This concept is highly suitable for more than meeting future legal requirements. However, the constructional embodiment described provides, in the inside of the filler neck, sealing surfaces for the seals which are exposed in such a manner that they can be touched and thus damaged by the refueling nozzle as it is inserted, which could impair the desired sealing function.

The object of the invention is to further optimize a tank cap of the type referred to in the introduction with a sealing system having at least two seals, and in particular, to ensure that damage cannot be caused to the sealing surfaces by the refueling nozzle.

SUMMARY OF THE INVENTION

According to the invention, the object is achieved by virtue of the fact that the sealing surfaces on the neck are in each case provided behind a raised region of a protuberance or the like and/or below at least one projection or the like.

According to a preferred embodiment of the invention, the seals are arranged on parts of the cap part which, for opening and closing, are held in a non-rotational manner in relation to the neck. The consequently smaller operating forces during opening and closing increase convenience. The seals are also subjected to less stress.

According to a further feature of the invention, the projection(s) and the protuberance are formed on the neck itself. A neck embodied thus can be manufactured easily by injection-molding.

According to a preferred embodiment of the invention, the projections are those parts of the anti-rotation arrangement provided on the neck, as a result of which the constructional complexity of the tank cap is reduced.

If the sealing surface is provided behind a raised edge region of a protuberance running around on the neck, it is designed in particular as a formation running around in a groove-like manner. A sealing surface embodied thus cannot be reached or touched by the filling pipe of a refueling nozzle.

In a tank cap embodied according to the invention, it is particularly important that the seals make as good contact as possible against the sealing surfaces on the neck. It is therefore advantageous if the seals can be pressed against these sealing surfaces in a spring-assisted manner.

The associated constructional embodiment can be effected in a simple manner in that the seal lying further in is arranged on a sealing part which is mounted vertically, counter to the force of at least one resilient element, on an element of the cap part, which element can be rotated for opening and closing.

According to the invention, the seal lying further out is arranged on an intermediate ring which is arranged between the sealing part and the element of the cap part which can be rotated for opening and closing, and is mounted rotatably in relation to the latter. A very expedient and functionally reliable arrangement of the seal lying further out is thus achieved.

In this connection, according to the invention, the at least one resilient element acts on the intermediate ring as well and thus, via the intermediate ring, presses the seal lying further out against its sealing surface on the neck. In this connection, the seal lying further out interacts with a conical support surface on the upper side of the sealing part. These configurations also bring about a very compact embodiment of the components involved.

The compact and very expedient construction continues in the configuration of the anti-rotation arrangement as well, projections or the like formed on the outer circumferential edge of the intermediate ring forming those parts of the anti-rotation arrangement interacting with the projections of the neck.

BRIEF DESCRIPTION OF THE DRAWING

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
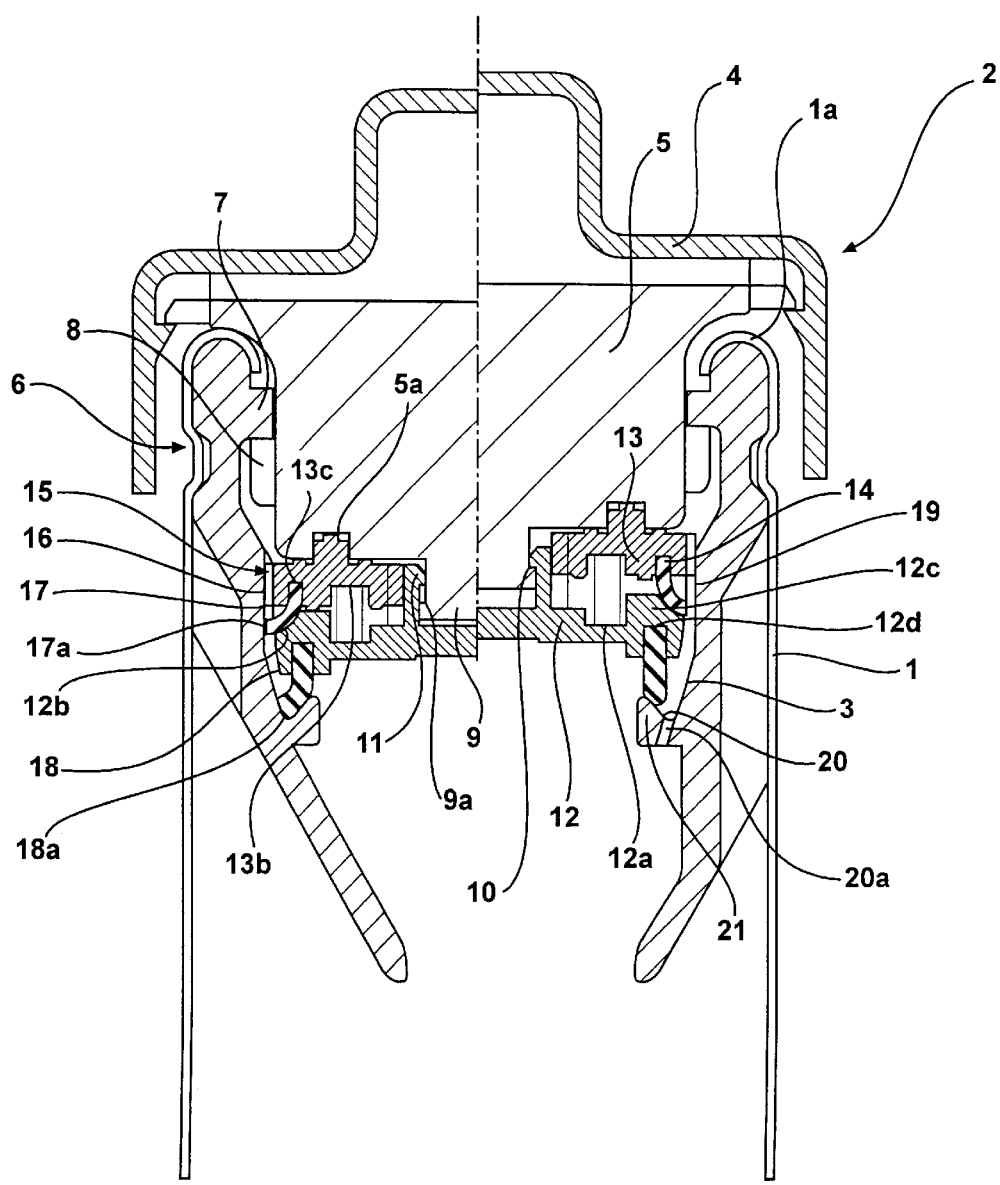
FIG. 1 is a cross-sectional view of a cap according to the invention in a vertical or longitudinal section, the left half illustrating the closed state and the right half the open state.

In the following description, the term "vertical" relates to the direction of the dot/dash line indicating the longitudinal axis of the cap. The expressions "above" and "below" relate to above and below in the illustration.

FIG. 1 shows the outer end region of a filler pipe 1 extending to a motor vehicle tank (not illustrated) and the cap part 2 which can close the latter. The invention envisages a special configuration and a special interaction of the cap part 2 which can be closed by hand and a neck 3 accommodated in the inside of the outer end region of the filler pipe 1.

The cap part 2 includes an outer grip piece 4 and an inner grip element 5 which is intended to be inserted into the neck 3. The grip element 5 is overlapped by the grip piece 4 at the side and is clipped in the usual manner or otherwise connected to the latter. The grip piece 4 is at the same time designed in such a manner that, when the cap part 2 has been put on, the grip piece 4 overlaps from the outside the end of the filler pipe 1 with a circumferential edge region. The neck 3 is fastened in the inside of the end region of the filler pipe 1, being held by an inwardly flanged edge 1*a* of the filler pipe 1 and a snap connection 6 which can be made in a conventional manner.

That part of the grip element 5 located inside the neck 3 when the cap part 2 has been put on is at least essentially cylindrical. To lock the cap part 2 on the neck 3, the grip element 5 is provided on its outer side with locking lugs 8 which interact with a thread segment 7 on the upper end region of the neck 3, so that the cap part 2 can be locked by rotation in the manner of a bayonet closure. However, this closure mechanism can also be embodied in another manner.

The grip element 5 is provided centrally on its underside with a cylindrical extension 9 which has a diameter which is comparatively small in relation to the remainder of its diameter. The central extension 9 is provided on the outside with a circumferential shoulder 9*a*, as a result of which its end region is imparted a slightly greater diameter. On a central, vertically upright annular part 11 of a sealing part 12, a circumferential support protuberance 10 is provided on the inside, which overlaps the shoulder 9*a* from above. Both between the annular part 11 and the underside of the grip element 5 and between the central extension 9 and the upper side of the essentially disk-shaped sealing part 12, some space remains for a relative movement, still to be described, of the sealing part 12 in relation to the grip element 5.

The sealing part 12 is supported resiliently in relation to the grip element 5 radially outside the annular part 11. To this end, an intermediate ring 13 essentially similar to a circular ring is provided, which, radially outside the central annular part 11, engages, by means of a guide protuberance 13*a* running around in an annular manner on its upper side, in a guide groove 5*a* running around on the underside of the grip element 5, and is mounted there. A groove-like recess 13*b* running around on the underside of the intermediate ring 13 forms an abutment or a support possibility for one end of a resilient element 14. Instead of one resilient element 14, a number of spring elements can be provided, in which case the recess running around can be replaced by a number of hollows. The second end(s) of the resilient element(s) 14 is or are supported in one or more recess 12*a* of the sealing part 12. The resilient element(s) 14 act(s) on the sealing part 12 in the vertical direction away from the intermediate ring 13.

The intermediate ring 13, the sealing part 12 and the seals 17, 18 arranged on these parts and still to be described do not rotate with the grip piece 4 and the grip element 5 during opening and closing of the cap part 2. This is made possible by the relative movement between the annular part 11 and the central extension 9 of the grip element 5 and also the relative movement between the grip element 5 and the intermediate ring 13 by means of the protuberance 13*a* engaging in the guide groove 5*a*. In addition, an anti-rotation arrangement acting between the intermediate ring 13 and the neck 3 is also provided. As indicated in the figure of the drawing, projections 15 or the like can be provided as an anti-rotation arrangement on the outer circumferential edge region of the intermediate ring 13, which projections form a type of toothing and interact and can be brought into engagement with second projections 16 which are provided circumferentially on the inside of the neck 3. The appropriate engagement of the projections 15, 16 can be ensured in a simple manner if the cap part 2 is to be brought into a specific position in relation to the neck 3 for insertion of the grip element 5.

Of the seals 17, 18 mentioned above, the seal 17 is arranged on the intermediate ring 13 and is consequently the seal lying further above, and the seal 18 is arranged on the sealing part 12 and forms the seal lying further in. Both seals 17, 18 are in particular preformed ring seals made of an elastomer.

The seal 17 is held, for example squeezed, in a groove 13*c* formed on the underside of the intermediate ring 13, and has a sealing lip 17*a* which interacts with a conical support surface 12*b* which is formed on the upper side of a rim 12*c* running around on the outside of the sealing part 12 and, when the cap part 2 is closed, is pressed against an at least essentially vertically running surface 19 on the inside of the neck 3. A comparison of the two halves of the figure of the drawing reveals that, when the cap part 2 is closed, the distance between the support surface 12*b* and the intermediate ring 13 is reduced somewhat under compression of the resilient element 14, as a result of which the sealing lip 17*a* is pressed against the sealing surface 19. Moreover, the sealing surface 19 is located just below the projections 16 of the neck 3 and consequently offset inwardly in relation to these, so that a filling pipe of a refueling nozzle (not drawn) cannot touch this region when inserted.

On the underside of the rim 12*c* of the sealing part 12, which runs around in an annular manner, a groove 12*d* running around is formed for receiving the second seal 18 which is slightly more voluminous than the first seal 17. The seal 18 also has a sealing lip 18*a* which extends vertically when the cap part 2 is not closed. The sealing lip 18*a* interacts with a protuberance 21 formed on the inside of the neck 3.

The protuberance 21 running around in the neck 3 has on its upper side a sealing surface 20 running around in a groove-like manner for the seal 18. The sealing surface 20 is protected against contact with the filling pipe of the refueling nozzle by the circumferential edge which is raised on the inside. When the cap part 2 is closed, the sealing lip 18*a* slides along the inner flank of the edge onto its sealing surface 20 and is pressed in there, as shown by a comparison of the two halves of the figure of the drawing.

The resilient element 14 therefore ensures indirectly that the two seals 17, 18 are pressed against their sealing surfaces 19, 20. The sealing of the cap part 2 is consequently brought about by the compression of the seals 17, 18 radially outwardly against their sealing surfaces 19, 20 on the neck 3. Since, as already mentioned, the seals 17, 18 are not co-rotated during the rotary movement for opening or closing the cap part 2, they are subjected to considerably less wear. Operation according to the invention—without co-rotation of the seals 17, 18—increases convenience owing to reduced operating forces during opening and closing. The position of the two sealing surfaces 19, 20 on the neck 3 moreover ensures that the filling pipe of the refueling nozzle cannot damage them when it is inserted. Any possible accumulation of fuel in the region of the sealing surface 20 can be avoided by at least one drainage opening 20*a* being provided in the protuberance 21.

The two seals 17, 18 are made from in particular an elastomer which is resistant to fuel and has good cold elasticity. The action of the sealing arrangement described in the inner seal 18 holds back in particular liquid fuel. Fuel vapors which pass by or diffuse through this seal are stopped by the second seal 17 which is therefore preferably designed so as to be especially vapor-impermeable. It is also advantageous here if the region to be sealed by the second seal 17 is kept very small.

The invention is not limited to the exemplary embodiment illustrated. It is in particular possible, for example, to arrange both sealing surfaces on the neck either behind raised regions or below projecting regions or to reverse the arrangements illustrated. The anti-rotation arrangement can be effected in a different place and a different manner. Combinations with further seals are also possible.

What is claimed is:

1. A tank cap comprising a cap part and a filler neck adapted for receiving a refueling nozzle wherein said neck can be closed by said cap part via a rotary closure; said cap part having at least two seals arranged on said cap part and active between said cap part and said neck; said neck having sealing surfaces provided behind a raised region of a protuberance and below at least one projection for providing a fluid impervious seal between said cap part and said filler neck; and wherein said seals are arranged on parts of said cap part which, for opening and closing, are held in a non-rotational manner in relation to said neck.

2. The tank cap as claimed in claim 1, wherein the projection and the protuberance are formed on the neck.

3. The tank cap as claimed in claim 2, wherein the projections are those parts of the anti-rotation arrangement provided on the neck.

4. The tank cap as claimed in claim 3, wherein the sealing surface running behind the protuberance is a formation running around in a groove-like manner.

5. The tank cap as claimed in claim 4, wherein the seals can be pressed against their sealing surfaces in a spring-assisted manner.

6. The tank cap as claimed in claim 5, wherein one of the seals is arranged on a sealing part which is mounted vertically movably, counter to the force of at least one resilient element, on an element of the cap part, which element of the cap part can be rotated for opening and closing.

7. The tank cap as claimed in claim 6, wherein the seal lying further out is arranged on an intermediate ring which is arranged between the sealing part and the element of the cap part which can be rotated for opening and closing, and is mounted rotatably in relation to the latter.

8. The tank cap as claimed in claim 7, wherein the at least one resilient element acts on the intermediate ring.

9. The tank cap as claimed in claim 8, wherein the seal lying further out interacts with a conical support surface on the upper side of the sealing part.

10. The tank cap as claimed in claim 9, wherein projections formed on the outer circumferential edge of the intermediate ring form those parts of the anti-rotation arrangement interacting with the projections of the neck.

* * * * *